United States Patent
Usikov et al.

(10) Patent No.: US 9,449,252 B1
(45) Date of Patent: Sep. 20, 2016

(54) SYSTEM AND METHOD FOR COLOR AND BRIGHTNESS ADJUSTMENT OF AN OBJECT IN TARGET IMAGE

(71) Applicant: SONY CORPORATION, Tokyo (JP)

(72) Inventors: Daniel Usikov, Newark, CA (US); Mohammad Gharavi-Alkhansari, San Jose, CA (US)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/837,111

(22) Filed: Aug. 27, 2015

(51) Int. Cl.
| | |
|---|---|
| G06K 9/00 | (2006.01) |
| G06K 9/46 | (2006.01) |
| G06T 5/00 | (2006.01) |
| G06K 9/62 | (2006.01) |
| G06T 7/60 | (2006.01) |
| G06K 9/52 | (2006.01) |
| G06T 7/40 | (2006.01) |

(52) U.S. Cl.
CPC .............. *G06K 9/4661* (2013.01); *G06K 9/46* (2013.01); *G06K 9/4652* (2013.01); *G06K 9/52* (2013.01); *G06K 9/6215* (2013.01); *G06T 5/00* (2013.01); *G06T 7/408* (2013.01); *G06T 7/60* (2013.01); *G06K 2009/4666* (2013.01)

(58) Field of Classification Search
None
See application file for complete search history.

(56) References Cited

U.S. PATENT DOCUMENTS

| | | | |
|---|---|---|---|
| 8,351,713 B2 | 1/2013 | Sun et al. | |
| 8,842,130 B1 | 9/2014 | Blank et al. | |
| 8,958,662 B1 | 2/2015 | Grosz et al. | |
| 2007/0092153 A1* | 4/2007 | Kagaya | H04N 1/622 382/254 |
| 2014/0071347 A1 | 3/2014 | Chen et al. | |
| 2016/0117848 A1* | 4/2016 | Hattori | G06T 11/001 382/103 |

FOREIGN PATENT DOCUMENTS

KR 10-1373471 * 3/2014 ............ H04N 13/00

* cited by examiner

*Primary Examiner* — Eueng-Nan Yeh
(74) *Attorney, Agent, or Firm* — Chip Law Group

(57) ABSTRACT

An image processing device determines a first brightness value of a first pre-specified area in proximity to an object mask of an object in a source image and a first average color value of the source image, and determines a second brightness value of a second pre-specified area in proximity to an object mask of the object in a target image and a second average color value of the target image. The brightness value of each pixel of the object in the target image is adjusted based on a ratio of the second brightness value and the first brightness value. A color value of each pixel of an object in the target image is adjusted when a difference value between the first average color value and the second average color value exceeds a threshold color value.

25 Claims, 5 Drawing Sheets

SYSTEM AND METHOD FOR COLOR AND BRIGHTNESS ADJUSTMENT OF AN OBJECT IN TARGET IMAGE

FIELD

Various embodiments of the disclosure relate to a system and method for color and brightness adjustment of an object. More specifically, various embodiments of the disclosure relate to a system and method for automatic adjustment of color and brightness of an object in a target image.

BACKGROUND

Typical image editing applications encompass various techniques, such as manipulation, enhancement, and/or transformation, to modify a target image. Such a target image may originally comprise a set of objects. In certain scenarios, another set of objects may be cut-pasted or copy-pasted from multiple source images and embedded into the target image. In such scenarios, the other set of embedded objects may look unnatural due to the difference in various image characteristics of the multiple source images and the target digital image. Thus, it may be desired that the various image characteristics of the other set of embedded objects are automatically adjusted to ensure that the other set of embedded objects appear natural and seamless under various lighting conditions in the target image.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A system and method for color and brightness adjustment of an object in a target image are provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
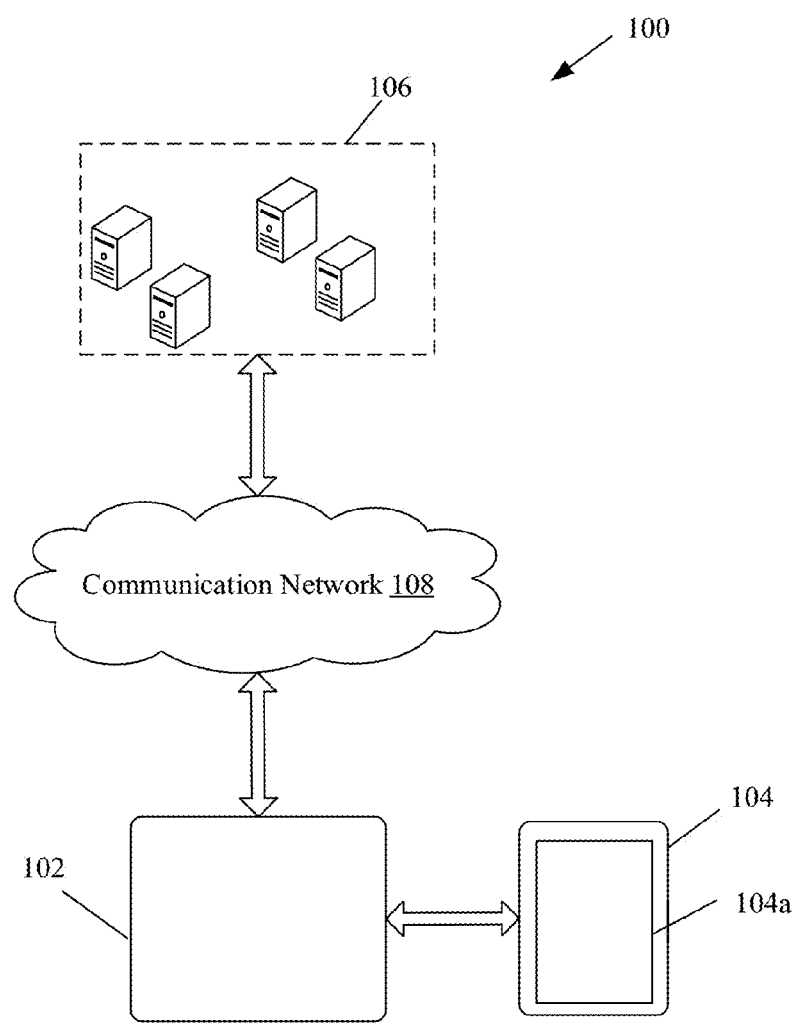
FIG. 1 is a block diagram that illustrates a network environment, in accordance with an embodiment of the disclosure.

Various implementations may be found in a system and/or method for color and brightness adjustment of an object in a target image. Exemplary aspects of the disclosure may comprise a method implemented in an image processing device. The method comprises determination of a first brightness value of a first pre-specified area in proximity to an object mask of an object in a source image and first average color value of the source image. The method may further comprise determination of a second brightness value of a second pre-specified area in proximity to an object mask of an object in a target image and second average color value of the target image The brightness value of each pixel of the object in the target image may be adjusted, based on a ratio of the second brightness value and the first brightness value. Further, the color value of each pixel of the object in the target image may be adjusted when a difference value between the first average color value and the second average color value exceeds a threshold color value.

In accordance with an embodiment, a height of an object box may be determined. The object box may encompass at least a portion of the object mask of the object in the source image. The first pre-specified area and the second pre-specified area may be determined based on the determined height of the object box. Further, the first pre-specified area and the second pre-specified area comprises at least a portion of the object box.

In accordance with an embodiment, the first brightness value may be determined based on a maximum brightness value of the first pre-specified area in the proximity of the object mask in the source image. In accordance with an embodiment, the second brightness value may be determined based on a maximum brightness value of the second pre-specified area in proximity of the object mask in the target image.

In accordance with an embodiment, a boost factor may be computed. The boost factor may correspond to a pre-determined range. The boost factor may correspond to the ratio of the second brightness value and the first brightness value. In accordance with an embodiment, adjustment of the brightness value of each pixel of the object in the target image may be further based on the brightness value of each pixel of the object in the source image. In accordance with an embodiment, adjustment of the brightness value of each pixel of the object in the target image may be allowed when the boost factor is within the pre-determined range.

In accordance with an embodiment, the color value of each pixel of the object in the target image may remain equal to the color value of each pixel of the object in the source image. In such a case, the difference value between the first average color value and the second average color value is less than the threshold color value. In accordance with an embodiment, one or more factors for the adjustment of the color value may be determined, based on a weighted parameter and the color value of each pixel of the object in the target image. In accordance with an embodiment, the adjustment of the color value of each pixel of the object in the target image may be independent of the adjustment of the brightness value of each pixel of the object in the target image.

FIG. 1 is a block diagram that illustrates a network environment, in accordance with an embodiment of the disclosure. With reference to FIG. 1, there is shown a network environment 100. The network environment 100 may include an image processing device 102, a display device 104, a display screen 104a, a plurality of cloud-based resources 106 and a communication network 108. The display device 104 may comprise the display screen 104a. The image processing device 102 may be communicatively connected to the plurality of cloud-based resources 106, via the communication network 108. In accordance with an embodiment, the display device 104 may be implemented within the image processing device 102. A person with ordinary skill in the art may understand that the scope of the disclosure is not limited to implementation of the display device 104 within the image processing device 102. In accordance with an embodiment, the image processing device 102 and the display device 104 may be implemented as separate entities communicatively connected with each other, without deviation from the scope of the disclosure.

The image processing device 102 may comprise suitable logic, circuitry, interfaces, and/or code that may be operable to process a target image that comprises one or more embedded objects. The image processing device 102 may process the target image to adjust the color and brightness of the one or more objects embedded in the target image. Examples of the image processing device 102 may include, but are not limited to, a smartphone, a camera, a tablet computer, a laptop, a wearable electronic device, a television, and/or an Internet Protocol Television (IPTV).

The display device 104 may comprise suitable logic, circuitry, interfaces, and/or code that may be operable to provide the display screen 104a to render the target image. Examples of the display device 104 may include, but are not limited to, a smartphone, a camera, a tablet computer, a laptop, a television, and/or an Internet Protocol Television (IPTV). The display screen 104a may comprise a user interface (UI) that may render an output image processed by the image processing device 102. The display screen 104a may be realized through several known technologies, such as, but not limited to, Liquid Crystal Display (LCD) display, Light Emitting Diode (LED) display, and/or Organic LED (OLED) display technology.

The plurality of cloud-based resources 106 may comprise one or more servers that may provide one or more functional services and/or image data to one or more subscribed electronic devices, such as the image processing device 102. The plurality of cloud-based resources 106 may be implemented by use of several technologies that are well known to those skilled in the art. The one or more servers from the plurality of cloud-based resources 106 may be associated with a single or multiple service providers. Examples of the one or more servers may include, but are not limited to, Apache™ HTTP Server, Microsoft® Internet Information Services (IIS), IBM® Application Server, Sun Java™ System Web Server, and/or a file server.

The communication network 108 may include a medium through which the image processing device 102 may communicate with one or more servers, such as the plurality of cloud-based resources 106. Examples of the communication network 108 may include, but are not limited to, the Internet, a cloud network, a Wireless Fidelity (Wi-Fi) network, a Wireless Local Area Network (WLAN), a Local Area Network (LAN), a plain old telephone service (POTS), and/or a Metropolitan Area Network (MAN). Various devices in the network environment 100 may be operable to connect to the communication network 108, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, cellular communication protocols, and/or Bluetooth (BT) communication protocols.

In operation, the image processing device 102 may process a target image that may include at least an object from another image, such as a source image. In accordance with an embodiment, the source image and the target image may be provided to the image processing device 102 by the plurality of cloud-based resources 106, via the communication network 108.

In accordance with an embodiment, the image processing device 102 may be operable to generate an object box that may encompass an object mask of the object in the source image. The image processing device 102 may be operable to determine a height and width of the object box. In accordance with an embodiment, a first pre-specified area and second pre-specified area may be determined based on the determined height and width of the object box in the source image and the target image, respectively. The determined first pre-specified area and the second pre-specified area may be in proximity to the object mask of the object in the source image and the target image, respectively.

In accordance with an embodiment, the image processing device 102 may be operable to determine a first brightness value of the first pre-specified area in proximity to the object mask of the object in the source image. The image processing device 102 may determine the first brightness value based on a maximum brightness value of the first pre-specified area in the proximity of the object mask in the source image. The image processing device 102 may be further operable to determine a second brightness value of the second pre-specified area in proximity to the object mask of the object in the target image. The image processing device 102 may further determine the second brightness value based on a maximum brightness value of the second pre-specified area in the proximity of the object mask in the target image. The image processing device 102 may be operable to compute a boost factor that may correspond to a pre-determined range. The boost factor may correspond to a ratio of the second brightness value in the target image and the first brightness value in the source image.

Based on the boost factor, the image processing device 102 may adjust the brightness value of each pixel of the object in the target image. In accordance with an embodiment, the image processing device 102 may be operable to adjust the brightness value of a block of pixels of the object in the target image, based on the boost factor. In accordance with an embodiment, the image processing device 102 may be operable to allow the brightness adjustment of each pixel or block of pixels of the object in the target image when the boost factor is within the pre-determined range. In accordance with an embodiment, the image processing device 102 may be further operable to adjust the brightness value of each pixel of the object in the target image, based on a brightness value of each pixel of the object in the source image.

In accordance with an embodiment, the image processing device 102 may be operable to determine a first average color value and a second average color value of the source image and the target image, respectively. The image processing device 102 may be operable to determine a difference value between the first average color value and the second average color value. In accordance with an embodiment, the image processing device 102 may be further operable to adjust the color value of each pixel of the object in the target image when the difference value exceeds a threshold color value. In accordance with an embodiment, the color value of each pixel of the object in the target image remains equal to the color value of each pixel of the object in the source image when the difference value is less than the threshold color value.

Figure 2:
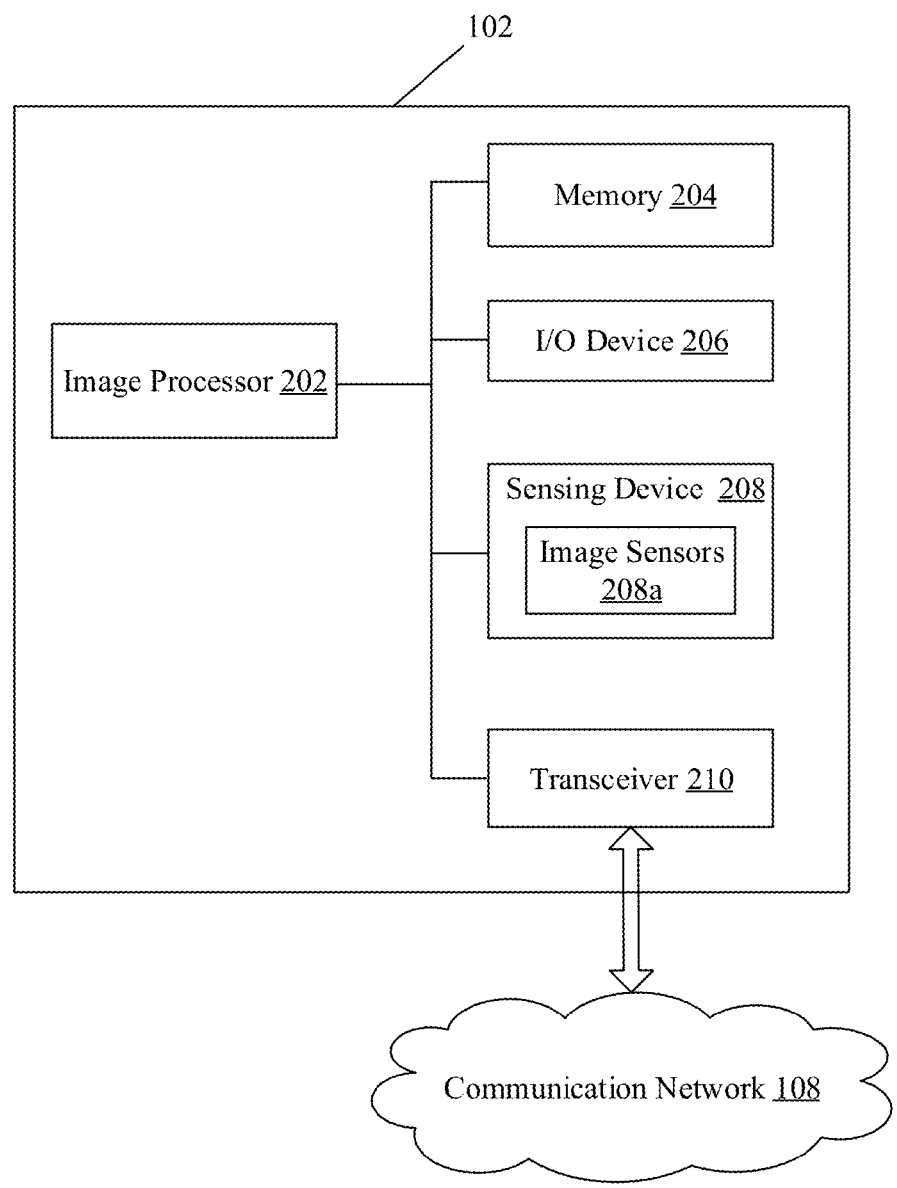
FIG. 2 is a block diagram that illustrates an exemplary image processing device, in accordance with an embodiment of the disclosure.

The image processing device 102 may be further operable to determine one or more factors for the adjustment of the color value, based on a weighted parameter and the color value of each pixel of the object in the target image. In accordance with an embodiment, the adjustment of the color value of each pixel of the object in the target image is independent of the adjustment of the brightness value of each pixel of the object in the target image FIG. 2 is a block diagram that illustrates an exemplary image processing device, in accordance with an embodiment of the disclosure. FIG. 2 is explained in conjunction with elements from FIG. 1. With reference to FIG. 2, there is shown the image processing device 102. The image processing device 102 may comprise an image processor 202, a memory 204, one or more input/output (I/O) devices, such as an I/O device 206, one or more sensing devices, such as a sensing device 208, and a transceiver 210. With reference to FIG. 2, there is further shown the one or more image sensors, such as image sensors 208a, and the communication network 108 (as described in FIG. 1).

The image processor 202 may be communicatively connected to the memory 204, the I/O device 206, the sensing device 208 and the transceiver 210. The transceiver 210 may be operable to communicate with the one or more servers, such as the plurality of cloud-based resources 106, via the communication network 108.

The image processor 202 may comprise suitable logic, circuitry, interfaces, and/or code that may be operable to execute a set of instructions stored in the memory 204. The one or more circuits in the image processor 202 may be further configured to adjust the color and brightness of the object in the target image based on the color and brightness values of both the source image and the target image. The image processor 202 may be implemented based on a number of image processor technologies known in the art. Examples of the image processor 202 may be an X86-based processor, a Reduced Instruction Set Computing (RISC) processor, an Application-Specific Integrated Circuit (ASIC) processor, a Complex Instruction Set Computing (CISC) processor, and/or other processors.

The memory 204 may comprise suitable logic, circuitry, and/or interfaces that may be operable to store a machine code and/or a computer program with at least one code section executable by the image processor 202. The memory 204 may be further operable to store digital images, such as the target image, in which one or more objects are embedded. The memory 204 may be further operable to store one or more layer-mask and/or clipping-mask algorithms. The memory 204 may be further operable to store one or more image processing and/or color vision algorithms. The memory 204 may be further operable to store operating systems and associated applications. Examples of implementation of the memory 204 may include, but are not limited to, Random Access Memory (RAM), Read Only Memory (ROM), Hard Disk Drive (HDD), Flash memory, and/or a Secure Digital (SD) card.

The I/O device 206 may comprise suitable logic, circuitry, interfaces, and/or code that may be operable to receive an input from the user (not shown). The I/O device 206 may be further operable to provide an output to the user. The I/O device 206 may comprise various input and output devices that may be operable to communicate with the image processor 202. Examples of the input devices may include, but are not limited to, the image capturing unit, a camcorder, a touch screen, a keyboard, a mouse, a joystick, a microphone, a motion sensor, a light sensor, and/or a docking station. Examples of the output devices may include, but are not limited to, the display screen 104a in the display device 104, a projector screen, and/or a speaker.

The sensing device 208 may comprise suitable logic, circuitry, and/or interfaces that may be operable to store a machine code and/or a computer program with at least one code section executable by the image processor 202. The sensing device 208 may further comprise one or more sensors, such as the image sensors 208a, configured to aid in capture of one or more images and/or videos. Examples of the sensing device 208 may include, but are not limited to, an accelerometer, a global positioning system (GPS) sensor, a compass or magnetometer, an ambient light sensor, a tricorder, a gyroscope, a proximity sensor, an image sensor, a lux meter, a touch sensor, an infrared sensor, and/or other sensors.

The transceiver 210 may comprise suitable logic, circuitry, interfaces, and/or code that may be operable to communicate with one or more servers, such as the plurality of cloud-based resources 106, via the communication network 108 (as shown in FIG. 1). The transceiver 210 may implement known technologies to support wired or wireless communication of the image processing device 102 with the communication network 108. The transceiver 210 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

The transceiver 210 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

In operation, the transceiver 210 may receive the source image and/or the target image from the plurality of cloud-based resources 106, via the communication network 108. The transceiver 210 may further communicate the received source image and/or the target image to the image processor 202. In accordance with an embodiment, the image sensors 208a may capture the source image and/or the target image. The image sensors 208a may communicate the captured source image and/or the target image to the image processor 202.

The image processor 202 may receive a user input from the user, via the input device, such as a mouse, of the I/O device 206. Based on the user input, one or more objects from the source image may be embedded into the target image. Examples of the user input may include a cut-paste operation, a copy-paste operation, and/or the like. For example, the user may use the mouse to perform a drag-and-drop operation on the one or more objects from the source image to the target image to provide the user input. In accordance with the received user input, the image processor 202 may embed the one or more objects from the source image into the target image. A person of ordinary skill in the art will understand that for brevity, the method for color and brightness adjustment is hereinafter explained with respect to one object. Notwithstanding, the disclosure may not be so limited, and the method may be further implemented for other objects from the one or more objects, without deviation from the scope of the disclosure.

In accordance with an embodiment, the image processor 202 may be configured to determine an object mask of the object in the source image, based on one or more layer-mask and/or clipping-mask algorithms. Such one or more layer-mask and/or clipping-mask algorithms may be retrieved from the memory 204 by the image processor 202. Based on the determined object mask, image processor 202 may generate an object box in a pre-defined shape, such as a rectangular shape, which may encompass the object mask. The object mask is encompassed in the object box in such a manner that all the four sides of the object box just touches the topmost, leftmost, bottommost, and rightmost edges of the object mask. The image processor 202 may be further configured to determine the height and the width of the object box. Based on the determined height and width of the object box, the image processor 202 may further determine a first pre-specified area, referred to as a first bottom box, and a second pre-specified area, referred to as a second bottom box, as explained in detail in FIG. 3B and FIG. 3C.

The image processor 202 may be configured to determine brightness value of each pixel outside the object mask in the first bottom box in the source image. The image processor 202 may be further configured to determine brightness value of each pixel outside the object mask in the second bottom box in the target image. The brightness value of each pixel may be determined by the image processor 202, based on one or more image processing and/or color vision algorithms, retrieved from the memory 204.

In accordance with an embodiment, the image processor 202 may be configured to determine a first brightness value in the first bottom box of the source image. Such first brightness value may correspond to a maximum brightness value of one or more pixels, outside the object mask, in the first bottom box of the source image. The image processor 202 may be further configured to determine a second brightness value in the second bottom box of the target image. The second brightness value may correspond to a maximum brightness value of one or more pixels, outside the object mask, in the second bottom box of the target image.

In accordance with an embodiment, the image processor 202 may be configured to compute a boost factor. The boost factor may correspond to a ratio of the determined second brightness value to the determined first brightness value. The boost factor may be determined in accordance with equation (1):

$$\text{Boost factor} = \frac{\text{(maximum brightness in the second bottom box of the target image)}}{\text{(maximum brightness in the first bottom box of the source image)}} \quad (1)$$

In accordance with an embodiment, the boost factor within a pre-determined range, such as, "0.7 to 2.5", is acceptable. Notwithstanding, the boost factor may vary beyond the described pre-determined range, based on hardware and/or software configuration of the image processing device 102, without deviation from the scope of the disclosure.

Based on the computed boost factor, the image processor 20 may be configured to adjust the brightness value of each pixel of the object in the target image. The brightness value of each pixel of the object in the target image may be adjusted based on the brightness value of each pixel of the object in the source image. In accordance with an embodiment, the image processor 202 may be configured to determine the new brightness value of each pixel of the object in the target image in accordance with equation (2):

$$\text{New brightness value of the object in target image} = \text{(Brightness value of the object in the source image)} * \text{(boost factor)} \quad (2)$$

The image processor 202 may be configured to adjust the brightness value of each pixel of the object in the target image, based on the determined new brightness value. In accordance with an embodiment, the image processor 202 may allow the adjustment of the brightness value of each pixel of the object in the target image when the boost factor is within the pre-determined range, such as "0.7 to 2.5". In accordance with an embodiment, the new brightness value of each pixel of the object in the target image outside the pre-determined range may be optimized. Based on the optimization, the new brightness value may be adjusted to be within the pre-determined range.

In accordance with another aspect of the disclosure, the image processor 202 may be configured to determine color value of each pixel for each color channel in the source image and the target image. Such color value may be determined by the image processor 202, based on one or more image processing and/or color vision algorithms, retrieved from the memory 204. In accordance with an embodiment, the image processor 202 may be configured to determine a first average color value of the source image and a second average color value of the target image. The first average color value of the source image and a second average color value of the target image may be determined, based on the color value of each pixel for each color channel in the source image and the target image, respectively.

The image processor 202 may be configured to compute a difference value between the first average color value and the second average color value. In accordance with an embodiment, the image processor 202 may adjust the color value of each pixel of the object in the target image when the difference value exceeds a threshold color value. In accordance with an embodiment, the image processor 202 may not adjust the color value of each pixel of the object in the target image when the difference value is less than the threshold color value.

For color adjustment, the image processor 202 may be configured to determine a sum of brightness values of each pixel in the source image, such as, "$R_1$", "$G_1$", "$B_1$", across respective color channels, such as red, green, and blue. Similarly, the image processor 202 may be configured to determine a sum of brightness values, such as, "$R_2$", "$G_2$", "$B_2$", across respective color channels, such as red, green, and blue, of each pixel in the target image.

The image processor 202 may be further configured to determine a total brightness, such as "$S_1$", of the source image, which may be determined in accordance with equation (3):

$$S_1 = R_1 + G_1 + B_1 \qquad (3)$$

Similarly, the image processor 202 may be further configured to determine a total brightness, such as, "$S_2$", of the target image, which may be determined in accordance with equation (4):

$$S_2 = R_2 + G_2 + B_2 \qquad (4)$$

The image processor 202 may be further configured to compute a weighted value, such as, "d", in accordance with equation (5):

$$d = (R_1 * R_2 + G_1 * G_2 + B_1 * B_2)/\text{sqrt}((R_1 * R_1 + G_1 * G_1 + B_1 * B_1) * (R_2 * R_2 + G_2 * G_2 + B_2 * B_2)) \qquad (5)$$

where, the weighted value, such as "d", corresponds to a normalized scalar product of the respective average color values of the source and target image. The weighted value may vary within a pre-determined range, such as "0 to 1".

The image processor 202 may be further configured to compute an additional factor, such as "β", based on at least the equations (3) and (4), in accordance with equation (6):

$$\beta = (S_1 * S_2)/(R_1 * R_2 + G_1 * G_2 + B_1 * B_2) \qquad (6)$$

The image processor 202 may be further configured to compute a weighing factor, such as "c", based on at least the equation (5), in accordance with equation (7):

$$c = d^P \qquad (7)$$

where, "P" corresponds to an optimal parameter value and may be experimentally determined to be a numeric value, such as "30".

The image processor 202 may be further configured to determine one or more factors for the adjustment of the color value, based on a weighted parameter and the color value of each pixel of the object in the target image. The one or more factors may correspond to respective color channels, such as red, green, and blue, of each pixel of the object in the target image. The one or more factors may be determined, based on at least the equations (4), (6), and (7), in accordance with equations (8), (9), and (10):

$$\alpha_R = c + (1-c) * \beta * (R_2/S_2) \qquad (8)$$

$$\alpha_G = c + (1-c) * \beta * (G_2/S_2) \qquad (9)$$

$$\alpha_B = c + (1-c) * B * (B_2/S_2) \qquad (10)$$

Figure 3A:
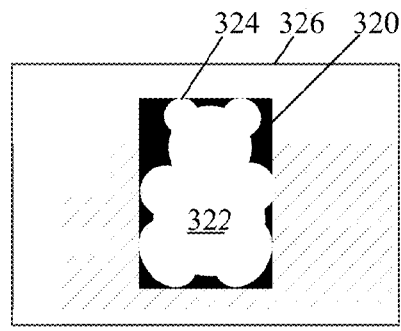
FIG. 3A is a first illustration for generation of an object box, in accordance with an embodiment of the disclosure.

The image processor 202 may be further configured to determine the color adjustments of each pixel of the object in the target image, based on the one or more factors. The one or more factors correspond to respective color channels, such as red, green, and blue, of RGB color space of each pixel of the object in the target image. Notwithstanding, the disclosure may not be so limited, and other color spaces, such as CMYK, and corresponding color channels, such as cyan, magenta, yellow, and black, may also be implemented, without deviation from the scope of the disclosure. In accordance with an embodiment, the adjustment of the color value of each pixel of the object in the target image may be independent of the adjustment of the brightness value of each pixel of the object in the target image FIG. 3A is a first illustration for generation of an object box, in accordance with an embodiment of the disclosure. FIG. 3A is explained in conjunction with elements from FIG. 1 and FIG. 2. With reference to FIG. 3A, there is shown a source image 320, an object 322, an object mask 324, and an object box 326. The source image may include the object 322, such as a toy. The image processor 202 may be configured to determine the object mask 324 of the object 322. The object mask 324 may be determined based on one or more layer-mask and/or clipping-mask algorithms, retrieved from the memory 204. Based on the determined object mask 324, the object box 326 may be determined. The object box 326 may encompass the object mask 324, such that the rectangular object box 326 just touches the object 322 from all the four sides.

Figure 3B:
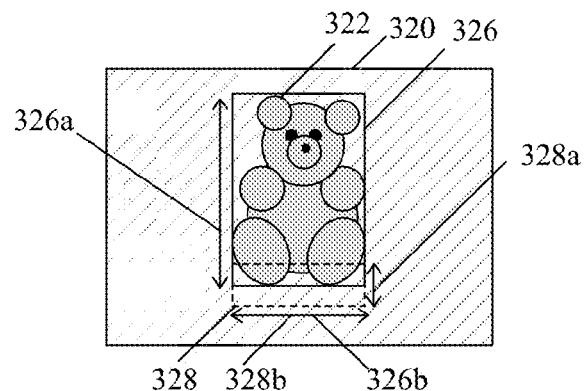
FIG. 3B is a second illustration for determination of a first pre-specified area in proximity to an object mask of an object in a source image, in accordance with an embodiment of the disclosure.

FIG. 3B is a second illustration for determination of a first pre-specified area in proximity to an object mask of an object in source image, in accordance with an embodiment of the disclosure. FIG. 3B is explained in conjunction with elements from FIG. 1, FIG. 2, and FIG. 3A. With reference to FIG. 3B there is shown the source image 320, the object 322, the object box 326, and a first bottom box 328. There is further shown height 326a and width 326b of the object box 326. Further, there is shown height 328a and width 328b of the first bottom box 328, in accordance with FIG. 2.

With reference to FIG. 3B, the source image 320 may comprise the object 322, such as the toy. The image processor 202 may be configured to determine the height 326a and width 326b of the object box 326. The image processor 202 may be further configured to determine a first pre-specified area, such as the first bottom box 328, in proximity to the object mask 324 of the object 322. The image processor 202 may be further configured to determine the height 328a and width 328b of the first bottom box 328, based on the height 326a and width 326b of the object box 326. In an instance, the height 328a of the first bottom box 328 may be one-fifth of the height 326a of the object box 326 and the width 328b of the first bottom box 328 may be equal to the width 326b of the object box 326.

Figure 3C:
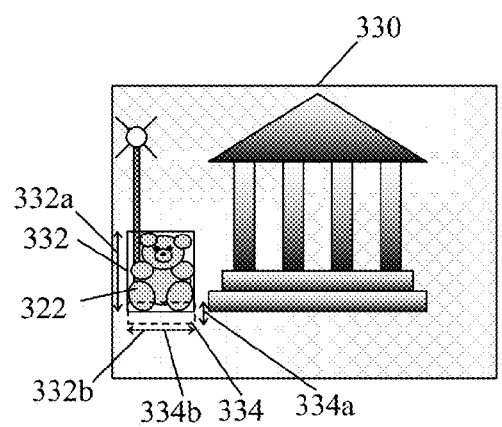
FIG. 3C is a third illustration for determination of a second pre-specified area in proximity to an object mask of an object in a target image, in accordance with an embodiment of the disclosure.

FIG. 3C is a third illustration for determination of a second pre-specified area in proximity to an object mask of an object in a target image, in accordance with an embodiment of the disclosure. FIG. 3C is explained in conjunction with elements from FIG. 1, FIG. 2, FIG. 3A and FIG. 3B. With reference to FIG. 3C there is shown a target image 330, an object box 332, and a second bottom box 334. The object 322, as shown in FIG. 3B, may be embedded into the target image 330. There is further shown height 332a and width 332b of the object box 332. There is further shown height 334a and width 334b of the second bottom box 334. The first bottom box 328 is explained in FIG. 3B.

With reference to FIG. 3C, the target image 330 may comprise the object 322, such as the toy. The object 322 may be cut-pasted or copy-pasted from the source image 320 (FIG. 3B). The brightness and color of the target image 330 may be different from the source image 320, due to variation in the ambience light conditions in the target image 330. The variation in the ambience light conditions in the target image 330 may be due to a lamppost, as shown in FIG. 3C. The object 322 may be pasted or embedded in the target image 330 at a specific location, such as under the lamppost.

The image processor 202 may be configured to determine the height 332a and width 332b of the object box 332. The image processor 202 may be further configured to determine a second pre-specified area, such as the second bottom box 334, in proximity to the object mask of the object 322. The image processor 202 may be further configured to determine the height 334a and width 334b of the second bottom box 334, based on the height 332a and width 332b of the object box 332. In an instance, the height 334a of the second bottom box 334 may be one-fifth of the height 332a of the object box 332 and the width 334b of the second bottom box 334 may be equal to the width 332b of the object box 332.

Figure 4A:
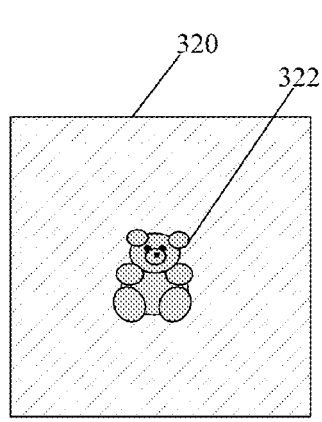
FIGS. 4A, 4B, 4C and 4D illustrate various exemplary scenarios for the implementation of the disclosed system and method for color and brightness adjustment of an object in a target image, in accordance with an embodiment of the disclosure.
Figure 4B:
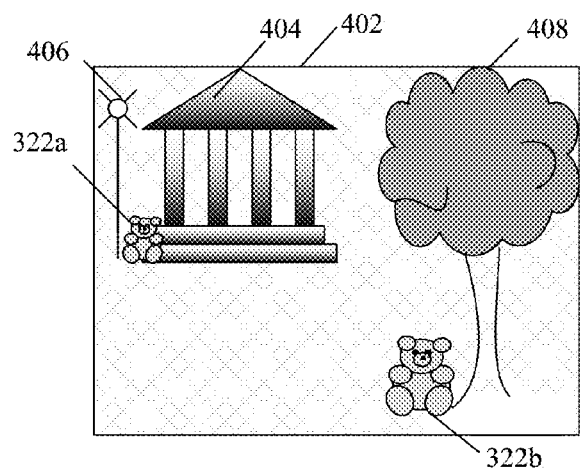
Figure 4C:
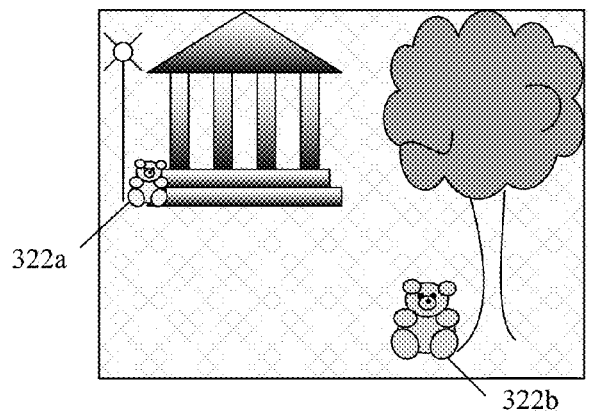
Figure 4D:
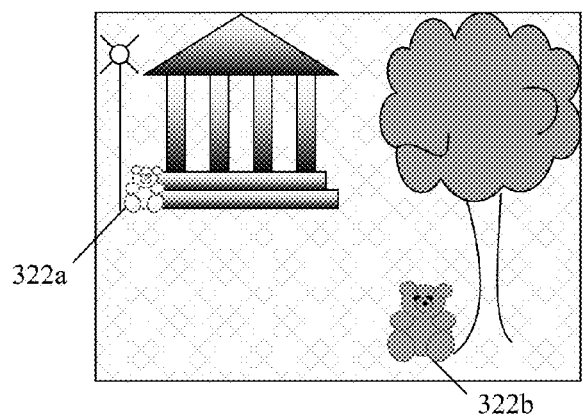

FIGS. 4A, 4B, 4C and 4D illustrate various exemplary scenarios for the implementation of the disclosed system and method for the color and brightness adjustment of an object in a target image, in accordance with an embodiment of the disclosure. FIGS. 4A, 4B, 4C and 4D are explained in conjunction with elements from FIG. 1, FIG. 2 and FIG. 3B. With reference to FIG. 4A, there is shown the source image 320 that comprises the object 322. FIG. 4A may be similar to FIG. 3B. With reference to FIGS. 4B, 4C and 4D, there is shown a target image 402, a house 404, a lamppost 406, and a tree 408.

In accordance with the various exemplary scenarios, as illustrated in FIGS. 4B, 4C and 4D, the object mask 324 of the object 322, may be determined in the source image 320, as described in FIG. 4A. Further, the object box 326 of the object 322 with the height 326a and width 326b, may be determined, as described in FIG. 3B. Based on the object box 326, the first bottom box 328 of the object 322 may further be determined, as described in FIG. 3B. The height 328a of the first bottom box 328 is one-fifth of the height of the object box 326, and the width 328b of the first bottom box 328 is same as the width of the object box 326.

Accordingly, in the target image 402, the object box 332 of the object 322 with the height 332a and width 332b, may be determined, as described in FIG. 3C. Based on the object box 332, the second bottom box 334 of the object 322 may be determined, as described in FIG. 3C. The height 334a of the second bottom box 334 is one-fifth of the height of the object box 332, and the width 334b of the second bottom box 334 is same as the width of the object box 332.

The object 322 may be cut-pasted or copy-pasted from the source image 320 to the target image 402. The desired color and brightness of the object 322 in the target image 402 may be different from the color and brightness of the object 322 in the source image 320. Such a variation of the color and brightness may be due to one or more factors, such as light conditions, in the target image 402. The brightness value of each pixel in the first bottom box 328, outside the object mask 324, in the source image 320, may be determined. Accordingly, a maximum brightness value, such as, "120", of the first bottom box 328, in the source image 320 may be determined. Further, the brightness value of each pixel in the second bottom box 334, outside the object mask 324, in the target image 402 may be determined. Accordingly, a maximum brightness value, such as, "220", of the second bottom box 334, in the target image 402 may be determined.

In accordance with a first exemplary scenario, as illustrated in FIG. 4B, two object instances of the object 322 may be copy-pasted from the source image 320 to the target image 402. The two object instances of the object 322 may be 322a and 322b. The two object instances 322a and 322b may be pasted at two different locations, such as a first location and a second location, in the target image 402. The first location may be under the lamppost 406 and the second location may be under the tree 408. The dimensions of the first object instance 322a in the target image 402 may be less than the dimensions of the object 322 in the source image 320. The dimensions of the second object instance 322b in the target image 402 may be similar to the dimensions of the object 322 in the source image 320. However, in the first exemplary scenario, neither the color nor the brightness is adjusted, due to which the two object instances 322a and 322b of the object 322 may appear unnatural.

In accordance with a second exemplary scenario, as illustrated in FIG. 4C, the brightness value of the first object instance 322a, located under the lamppost 406, and the brightness value of the second object instance 322b, located under the tree 408, in the target image 402, may be adjusted. The respective brightness values of the first object instance 322a and the second object instance 322b may be adjusted, in accordance with the ambient light conditions. The brightness value of the first object instance 322a, located under the lamppost 406, may be greater than the brightness value of the second object instance 322b, under the tree 408. The image processor 202 may be configured to determine maximum brightness value, such as "120", of the first bottom box 328 in the source image 320. The image processor 202 may be further configured to determine the maximum brightness value, such as "200", of the second bottom box 334 of the first object instance 322a, under the lamppost 306, in the target image 402. The image processor 302 may be further configured to determine the maximum brightness value, such as "100", of the second bottom box 334 of the second object instance 322b under the tree 408, in the target image 402.

Based on the determined maximum brightness values, the boost factor may be determined, in accordance with the equation (1). Accordingly, the boost factors for the first object instance 322a and the second object instance 322b may be determined as, "0.83" and "1.67", respectively. Further, the brightness value to be adjusted for the first object instance 322a and second object instance 322b may be determined in accordance with the equation (2). Accordingly, the adjusted brightness values for the first object instance 322a and the second object instance 322b may be determined as, "200" and "100", respectively.

In accordance with third exemplary scenario, as illustrated in FIG. 4D, the color value of the first object instance 322a, located under the lamppost 406, may be different from the color value of the second object instance 322b, located under the tree 408. Such respective color values of the first object instance 322a and the second object instance 322b may be adjusted, in accordance with the ambient light conditions. The image processor 202 may be configured to determine color value of each pixel in the source image 320 and the target image 402. For example, the color value of each pixel in the source image 320 and the target image 402 may be selected from the RGB color space. The color value of each pixel in the RGB color space may be selected from a defined range, such as, "0 to 255". The image processor 202 may be configured to determine the color value of each pixel in respective color channels, such as "$R_1=120$", "$G_1=120$", and "$B_1=120$", in the source image 320. The image processor 202 may be further configured to determine the color value of each pixel in respective color channels, such as, "$R_2=150$", "$G_2=150$", and "$B_2=150$", in the target image 402. Based on the determined color value of each pixel in the source image 320, the first average color value (depicted by "A1"), such as "120", of the source image 320 may be determined. Further, the second average color value (depicted by "A2"), such as, "150", of the target image 402 may be determined.

The image processor 202 may be configured to determine a difference value (depicted by "D=A2−A1"), such as "30", between the first average color value of the source image 320, and the second average color value of the target image 402. The difference value, such as "30", exceeds a threshold color value, such as "20". Thus, the color value of each pixel of the first object instance 322a and second object instance 322b, in the target image 402, is adjusted.

Such an adjustment of the color value of each pixel of the first object instance 322a and second object instance 322b may be adjusted in accordance with the ambient light conditions in the target image 402. The image processor 202 may be further configured to determine the total brightness, such as "360", of the object 322 in the source image 320. The image processor 202 may be further configured to determine the total brightness, such as "450", of the first object instance 322a in the target image 402. Such total brightness of the object 322 in the source image 320 and the first object instance 322a in the target image 402 may be determined in accordance with the equations (3) and (4), respectively.

Further, the image processor 202 may be configured to compute a weighted value, such as "d", and an additional factor, such as "β", in accordance with the equations (5) and (6), respectively. The image processor 202 may be further configured to determine a weighing factor, such as "c", in accordance with the equation (7). Accordingly, the weighted value, the additional factor, and the weighing factor may be computed as, "3", "1", and "1", respectively. Further, the one or more factors, such as, "$\alpha_R$", "$\alpha_G$", "$\alpha_B$", may be computed, based on the equations (8), (9), and (10). Such one or more factors may be applied to the respective color channels of each pixel of the first object instance 322a under the lamppost 406 in the target image 402 to adjust the color value.

A person with ordinary skill in the art will understand that one or more factors may be computed for the respective color channels of each pixel of the second object instance 322b under the tree 408 in the target image 402, in the similar way as described above. The computed one or more factors may be applied to each pixel of the second object instance 322b for color adjustment, without deviation from the scope of the disclosure.

Figure 5:
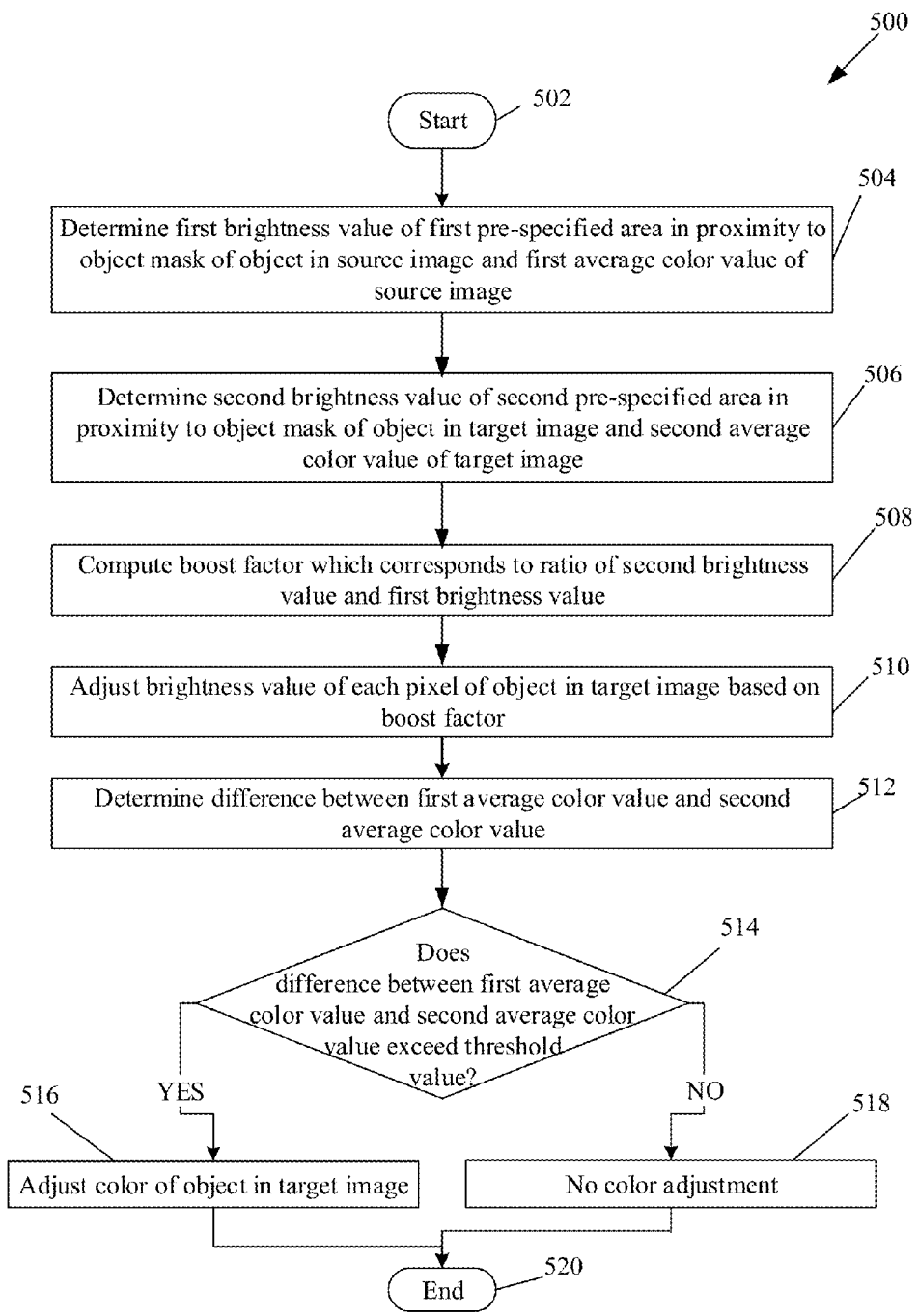
FIG. 5 is a flowchart that illustrates a method for color and brightness adjustment of an object in a target image, in accordance with an embodiment of the disclosure.

FIG. 5 is a flowchart that illustrates a method for color and brightness adjustment of an object in a target image, in accordance with an embodiment of the disclosure. With reference to FIG. 5, there is shown a flow chart 500. The flow chart 500 is described in conjunction with FIGS. 1 and 2. The method starts at step 502 and proceeds to step 504.

At step 504, the first brightness value of the first pre-specified area in proximity to the object mask of the object in the source image may be determined. Further, the first average color value in the source image may be determined. At step 506, the second brightness value of second pre-specified area in proximity to the object mask of the object in the target image may be determined. Further, the second average color value in the target image may be determined. At step 508, the boost factor may be computed. The boost factor may correspond to the ratio of the second brightness value to the first brightness value. At step 510, the brightness value of each pixel of the object in target image may be adjusted based on the computed boost factor.

At step 512, a difference value between the first average color value and the second average color value may be determined. At step 514, it may be determined whether the difference value exceeds a threshold color value. In an instance, when the difference value exceeds the threshold value, the control passes to step 516. In an instance, when the difference value is less than the threshold value, the control passes to step 518.

At step 516, when the difference value exceeds the threshold color value, the color value of each pixel of the object may be adjusted in the target image. Control passes to end step 520. At step 518, when the difference value is less than the threshold color value, the color value of each pixel of the object may not be adjusted in the target image. Control passes to end step 520.

In accordance with an embodiment of the disclosure, a system for color and brightness adjustment of an object in a target image is disclosed. The system may comprise a display device 104, and one or more circuits in an image processor 202 (FIG. 2) of an image processing device 102. The image processing device 102 may be communicatively coupled to the display device 104. The image processing device 102 may be configured to determine a first brightness value of a first pre-specified area in a source image and a first average color value of the source image. The first pre-specified area may be in proximity to an object mask of the object in the source image. The image processing device 102 may be further configured to determine a second brightness value of a second pre-specified area in a target image and a second average color value of the target image. The second pre-specified area may be in proximity to the object mask of the object in the target image. The brightness value of each pixel of the object in the target image may be adjusted based on the ratio of second brightness value and first brightness value. Further, the image processing device 102 may be configured to adjust the color value of each pixel of the object in target image. This may occur when a difference value between the first average color value and the second average color value exceeds a threshold color value.

Various embodiments of the disclosure may provide a non-transitory computer/machine readable medium and/or storage medium, wherein there is stored thereon, a machine code and/or a computer program with at least one code section executable by a machine and/or a computer for color and brightness adjustment of an object. The at least one code section in the image processing device 102 may cause the machine and/or computer to perform the steps that comprise the determination of a first brightness value of a first pre-specified area in a source image and a first average color value of the source image. The first pre-specified area may be in proximity to an object mask of the object in the source image. Further a second brightness value of a second pre-specified area in a target image and a second average color value of the target image may be determined. The second pre-specified area may be in proximity to the object mask of the object in the target image. The brightness value of each pixel of the object in the target image may be adjusted, based on the ratio of second brightness value and first brightness value. Further, the image processing device 102 may cause the machine and/or computer to adjust the color value of each pixel of the object in target image when a difference value between the first average color value and the second average color value exceeds a threshold color value.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A system for color and brightness adjustment of an object in a target image, said system comprising:
    a display device; and
    one or more circuits in an image processing device communicatively coupled to said display device, said one or more circuits being configured to:
    determine a first brightness value of a first pre-specified area in a source image and a first average color value of said source image, wherein said first pre-specified area is in proximity to an object mask of said object in said source image;
    determine a second brightness value of a second pre-specified area in a target image and a second average color value of said target image, wherein said second pre-specified area is in proximity to said object mask of said object in said target image;
    adjust a brightness value of each pixel of said object in said target image based on a ratio of said determined said second brightness value and said determined said first brightness value; and
    adjust a color value of each pixel of said object in said target image when a difference value between said determined said first average color value and said determined said second average color value exceeds a threshold color value.

2. The system according to claim 1, wherein said one or more circuits are configured to determine height of an object box that encompasses at least a portion of said object mask of said object in said source image.

3. The system according to claim 2, wherein said one or more circuits are configured to determine said first pre-specified area and said second pre-specified area based on at least said determined height of said object box.

4. The system according to claim 2, wherein said first pre-specified area and said second pre-specified area comprises at least a portion of said object box.

5. The system according to claim 1, wherein said one or more circuits are configured to determine said first brightness value based on a maximum brightness value of said first pre-specified area in said proximity of said object mask in said source image.

6. The system according to claim 1, wherein said one or more circuits are configured to determine said second brightness value based on a maximum brightness value of said second pre-specified area in said proximity of said object mask in said target image.

7. The system according to claim 1, wherein said one or more circuits are configured to compute a boost factor, wherein said computed boost factor corresponds to said ratio of said second brightness value and said first brightness value.

8. The system according to claim 7, wherein said adjustment of said brightness value of each pixel of said object in said target image is further based on a brightness value of each pixel of said object in said source image.

9. The system according to claim 7, wherein said computed boost factor corresponds to a pre-determined range.

10. The system according to claim 9, wherein said one or more circuits are configured to allow said adjustment of said brightness value of each pixel of said object in said target image when said boost factor is within said pre-determined range.

11. The system according to claim 1, wherein said color value of each pixel of said object in said target image remains equal to said color value of each pixel of said object in said source image when said difference value between said determined said first average color value and said determined said second average color value is less than said threshold color value.

12. The system according to claim 1, wherein said one or more circuits are configured to determine one or more factors for said adjustment of said color value based on a weighted parameter and said color value of each pixel of said object in said target image.

13. The system according to claim 1, wherein said adjustment of said color value of each pixel of said object in said target image is independent of said adjustment of said brightness value of each pixel of said object in said target image.

14. A method for color and brightness adjustment of an object in a target image, said method comprising:
    in an image processing device:
    determining a first brightness value of a first pre-specified area in a source image and a first average color value of said source image, wherein said first pre-specified area is in proximity to an object mask of said object in said source image;
    determining a second brightness value of a second pre-specified area in a target image and a second average color value of said target image, wherein said second pre-specified area is in proximity to said object mask of said object in said target image;
    adjusting a brightness value of each pixel of said object in said target image based on a ratio of said determined said second brightness value and said determined said first brightness value; and
    adjusting a color value of each pixel of said object in said target image when a difference value between said determined said first average color value and said determined said second average color value exceeds a threshold color value.

15. The method according to claim 14, further comprising determining height of an object box that encompasses at least a portion of said object mask of said object in said source image.

16. The method according to claim 15, wherein said first pre-specified area and said second pre-specified area is determined based on at least said determined height of said object box.

17. The method according to claim 15, wherein said first pre-specified area and said second pre-specified area comprises at least a portion of said object box.

18. The method according to claim 14, further comprising determining said first brightness value based on a maximum value brightness of said first pre-specified area in said proximity of said object mask in said source image.

19. The method according to claim 14, further comprising determining said second brightness value based on a maximum brightness value of said second pre-specified area in said proximity of said object mask in said target image.

20. The method according to claim 14, further comprising computing a boost factor that corresponds to said ratio of said second brightness value and said first brightness value, wherein said boost factor corresponds to a pre-determined range.

21. The method according to claim 20, wherein said adjustment of said brightness value of each pixel of said object adjusted in said target image is further based on a brightness value of each pixel of said object in said source image.

22. The method according to claim 20, further comprising allowing said adjustment of said brightness value of each pixel of said object in said target image when said boost factor is within said pre-determined range.

23. The method according to claim 14, wherein said color value of each pixel of said object in said target image remains equal as a color value of each pixel of said object in said source image when said difference value between said determined said first average color value and said determined said second average color value is less than said threshold color value.

24. The method according to claim 14, further comprising determining one or more factors for said adjustment of said color value based on a weighted parameter and said color value of each pixel of said object in said target image.

25. A non-transitory computer readable storage medium having stored thereon, a set of instructions executable by a computer, thereby causing said computer to perform steps comprising:

in an image processing device:
determining a first brightness value of a first pre-specified area in a source image and a first average color value of said source image, wherein said first pre-specified area is in proximity to an object mask of said object in said source image;
determining a second brightness value of a second pre-specified area in a target image and a second average color value of said target image, wherein said second pre-specified area is in proximity to said object mask of said object in said target image;
adjusting a brightness value of each pixel of said object in said target image based on a ratio of said determined said second brightness value and said determined said first brightness value; and
adjusting a color value of each pixel of said object in said target image when a difference value between said determined said first average color value and said determined said second average color value exceeds a threshold color value.

* * * * *